W. H. PAINE.
Surveyor's Measure.

No. 29,514.

Patented Aug. 7, 1860.

WITNESSES

INVENTOR
Wm. H. Paine

UNITED STATES PATENT OFFICE.

WILLIAM H. PAINE, OF SHEBOYGAN, WISCONSIN.

SURVEYOR'S MEASURE.

Specification of Letters Patent No. 29,514, dated August 7, 1860.

*To all whom it may concern:*

Be it known that I, WILLIAM H. PAINE, of Sheboygan, in the county of Sheboygan and State of Wisconsin, have invented a new and useful Improvement in Surveyors' Measures; and I do hereby declare that the following is a full, clear, and exact description of the same, reference being had to the accompanying drawings, forming a part of this specification, in which—

Figure 1:
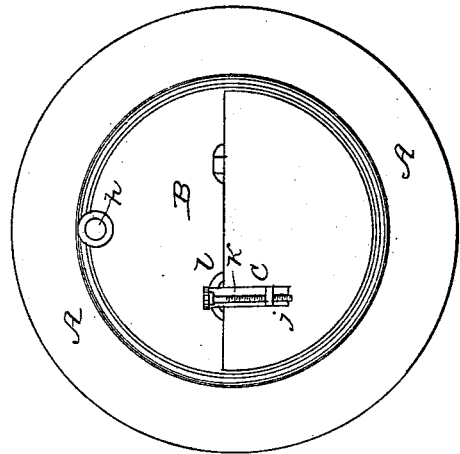
Figure 6:
Figure 3:
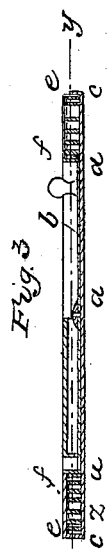
Figure 2:
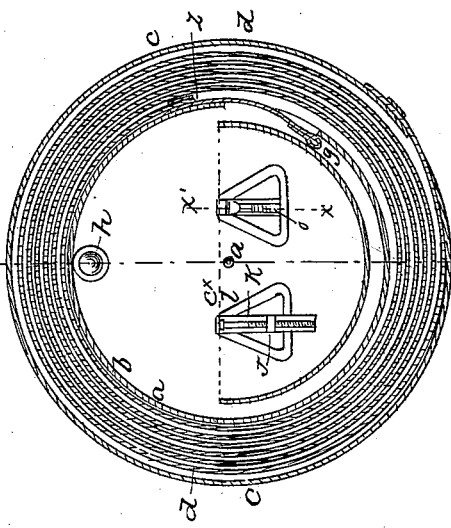
Figure 4:
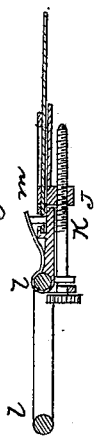
Figure 5:
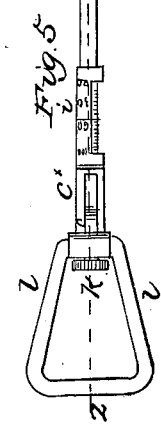

Figure 1, is a top or face view of my improved measure. Fig. 2, is a horizontal section of the same in line $y$, $y$, of Fig. 3. Fig. 3, is a vertical section in the line $x$, $x$, of Fig. 1. Fig. 4, is a top view of the expansion gage. Fig. 5 is a section of the same in the line $z$, $z$, and Fig. 6, is a section of a loop by which the end of the metal tape is held when the expansion gage is not used.

Similar letters of reference, in each of the several figures indicate corresponding parts.

The nature of my invention consists in the combination of the jointless metallic tape expansion indicating gage or scale, and circular case, in the manner and for the purposes herein described.

To enable others, skilled in the art, to make and use my invention, I will proceed to describe its construction and operation.

The circular case A, is constructed with a revolving drum B, which has its axis $a$, at the center of said case. The drum B, is formed by raising a rim $a$, round the circumference of a disk $b$. The circular case is formed by raising a rim $c$, on a lower disk $d$, and turning down a rim $e$, on the inner and outer circumferences of an annular capping plate $f$, and fitting the said capping plate down over the rim of the revolving drum and that of the lower disk. The tape is formed of thin metal in one piece and is applied to the case thus: One end is attached to a link $z$, passed through an opening cut in the rim $a$, of the drum and looped round a pin $g$, projecting up from the face of said drum. The other end is passed through an opening cut in the edge of the case. Thus attached, the tape is wound in scrolls round the drum by turning the drum with the knob $h$. To insure accurate measurement with a jointless metal strip or tape I provide a gage C, and so combine it with the strip that any contraction and expansion may be ascertained in a moment by referring to a thermometer carried in the pocket or attached to the top of the case.

The gage C, consists of a flat scale $i$, made tubular, a screw tapped lug $j$, and an adjusting screw $k$. This gage is attached to the underside of the loop or ring $l$, by which the metal tape is held while being used for measuring. To attach the metal tape to the scale, its perforated end is passed through the tubular scale and then under a spring catch or pin $m$, of the loop or ring, as represented.

It will be observed that the scale is so arranged that it can slide on the tape independently of the ring, when the screw is adjusted. Therefore if the scale and tape are properly adjusted with respect to a certain temperature indicated by a thermometer, and a change of temperature, say from 60 to 100 or from 60 down to zero, occurs, and a consequent expansion or contraction in the tape insures by turning the screw to the right or left (accordingly as the change may require) the set mark of the tape comes opposite either of said marks on the scale this expansion or contraction will be compensated for and thus accurate measurement obtained.

When the expansion gage is not in use, it, with the ring or holding loop is detached from the tape and inserted under a raised semi-circular plate, said plate forming a recess or chamber and having a slot cut in it to admit the adjusting screw, as represented.

I do not claim in this patent, the construction of the case, as a patent was granted to me for one of a substantially similar construction on the 10th day of July, 1860, but What I do claim as my invention and desire to secure by Letters Patent, is 1. A continuous sheet metal measurer for surveyors' purposes, substantially as set forth.

2. The combination of the jointless metal strip or tape, expansion indicating gage or scale, and circular case, the whole constructed and arranged and operating in the manner and for the purposes herein described.

WM. H. PAINE.

Witnesses:
GOODWIN Y. AT LEE,
ROBT. W. FENWICK.